United States Patent
Laaksonen et al.

(10) Patent No.: US 11,019,448 B2
(45) Date of Patent: May 25, 2021

(54) PROVIDING AUDIO SIGNALS IN A VIRTUAL ENVIRONMENT

(71) Applicant: Nokia Technologies Oy, Espoo (FI)

(72) Inventors: Lasse Laaksonen, Tampere (FI); Miikka Vilermo, Siuro (FI); Mikko Tammi, Tampere (FI); Arto Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/309,868

(22) PCT Filed: Jun. 16, 2017

(86) PCT No.: PCT/FI2017/050455
§ 371 (c)(1),
(2) Date: Dec. 13, 2018

(87) PCT Pub. No.: WO2018/002427
PCT Pub. Date: Jan. 4, 2018

(65) Prior Publication Data
US 2019/0335290 A1 Oct. 31, 2019

(30) Foreign Application Priority Data
Jun. 30, 2016 (EP) .................................... 16177107

(51) Int. Cl.
*H04S 7/00* (2006.01)
*G06F 3/16* (2006.01)

(52) U.S. Cl.
CPC .............. *H04S 7/304* (2013.01); *G06F 3/165* (2013.01); *H04S 2400/11* (2013.01)

(58) Field of Classification Search
CPC ...... H04S 7/303; H04S 7/304; H04S 2400/11; G06F 3/165
(Continued)

(56) References Cited

U.S. PATENT DOCUMENTS 5,666,138 A 9/1997 Culver
8,615,383 B2 12/2013 Dobbins et al.
(Continued)

FOREIGN PATENT DOCUMENTS

CN 104881537 A 9/2015
GB 2524269 * 9/2015
(Continued)

OTHER PUBLICATIONS

Tao et al., "Applying Virtual Sound Banier At a Room Opening for Transformer Noise Control", The 22" International Congress on Sound and Vibration, Jul. 16-22, 2015, pp. 1-8.
(Continued)

*Primary Examiner* — William A Jerez Lora
(74) *Attorney, Agent, or Firm* — Harrington & Smith

(57) ABSTRACT

An apparatus is disclosed, comprising at least one processor and at least one memory including computer program code, the at least one memory and the computer program code configured with the processor to cause the apparatus to perform the following steps. In a first step, the spatial position of a user in a real world space is detected. In another step, one or more audio signals are provided to the user representing audio from spatially-distributed audio sources in a virtual space. In another step, responsive to detecting movement of the user's spatial position from within a first zone to within a second zone within the real world space, the audio signals for selected ones of the audio sources are modified based on their spatial position in the virtual space.

20 Claims, 15 Drawing Sheets

(58) Field of Classification Search
USPC .................................................. 381/124, 310
See application file for complete search history.

(56) References Cited

U.S. PATENT DOCUMENTS

| | | | |
|---|---|---|---|
| 9,699,583 B1* | 7/2017 | Lyren | ..................... H04S 3/008 |
| 2009/0262946 A1* | 10/2009 | Dunko | ................... H04S 7/302 |
| | | | 381/17 |
| 2015/0094142 A1 | 4/2015 | Stafford | |
| 2016/0124502 A1 | 5/2016 | Sawyer et al. | |

FOREIGN PATENT DOCUMENTS

| | | | |
|---|---|---|---|
| GB | 2524269 | A | 9/2015 |
| WO | 2009/128859 | A1 | 10/2009 |
| WO | 2013/052855 | A2 | 4/2013 |
| WO | 2016/001909 | A1 | 1/2016 |
| WO | 2016/073783 | A1 | 5/2016 |

OTHER PUBLICATIONS

Office Action received for corresponding European Patent Application No. 16177107.6, dated Oct. 25, 2018, 4 pages.
Extended European Search Report received for corresponding European Patent Application No. 16177107.6, dated Dec. 15, 2016, 7 pages.
International Search Report and Written Opinion received for corresponding Patent Cooperation Treaty Application No. PCT/FI2017/050455, dated Sep. 20, 2017, 12 pages.

* cited by examiner

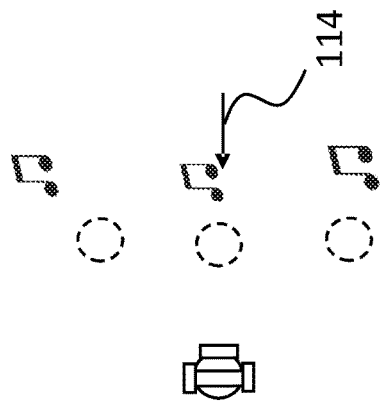
Fig. 16
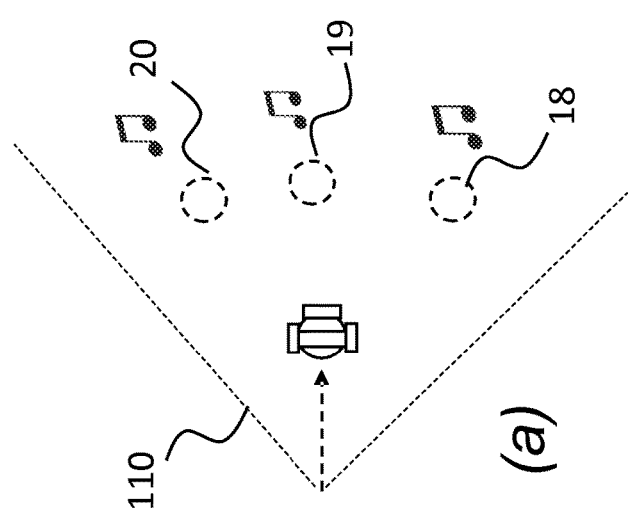
(a)
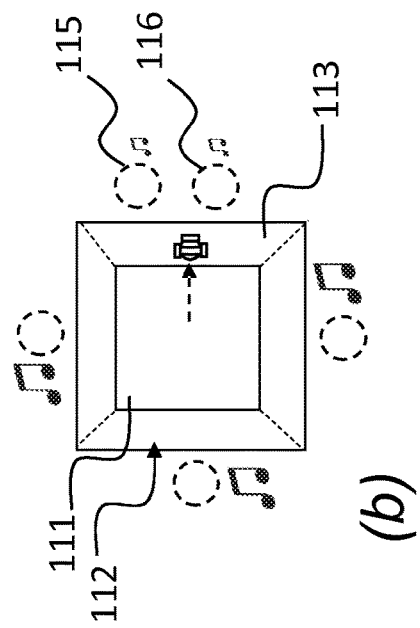
(b)
Fig. 15

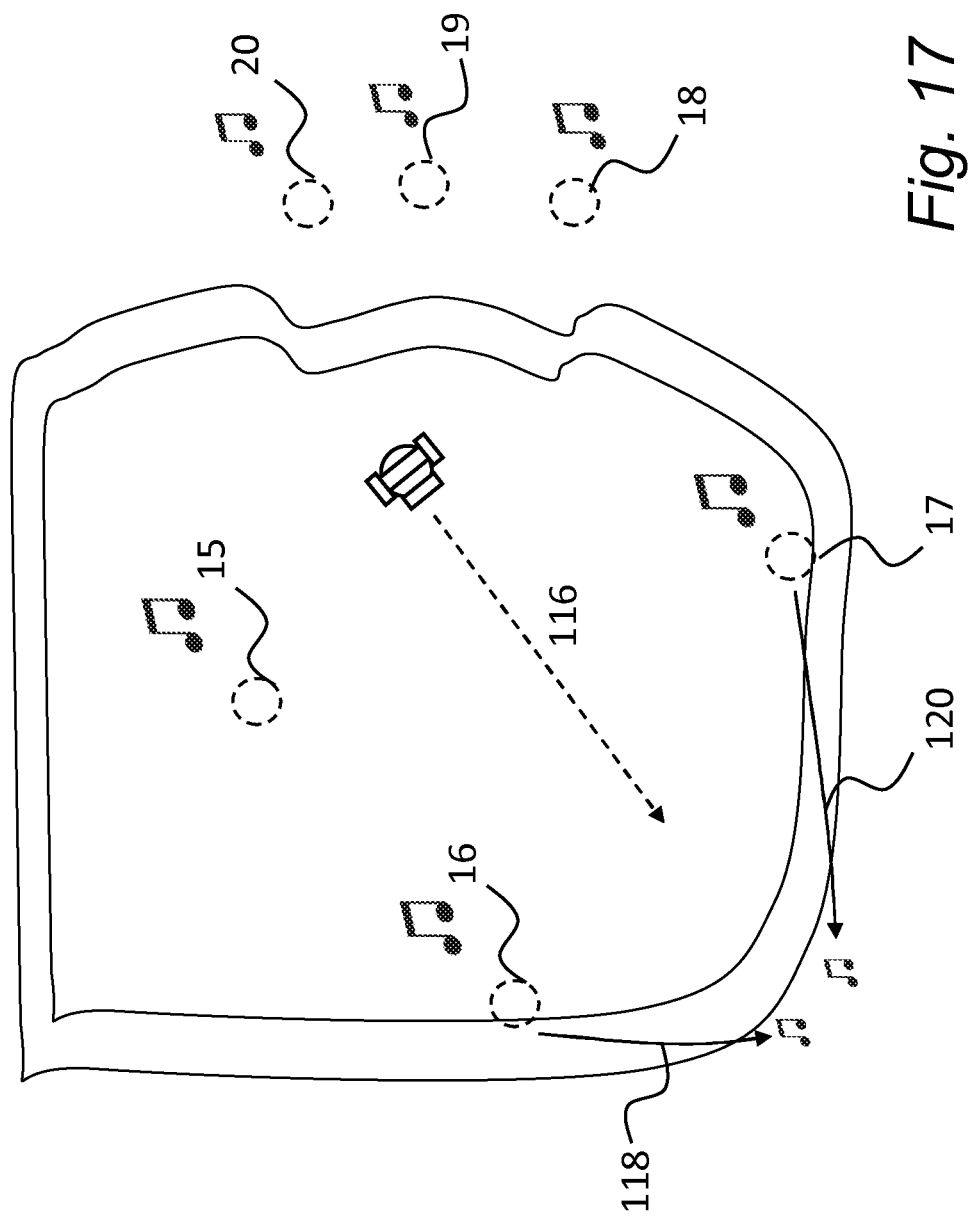

PROVIDING AUDIO SIGNALS IN A VIRTUAL ENVIRONMENT

RELATED APPLICATION

This application was originally filed as Patent Cooperation Treaty Application No. PCT/FI2017/050455 filed Jun. 16, 2017 which claims priority benefit to EP Patent Application No. 16177107.6, filed Jun. 30, 2016.

FIELD

This specification relates to providing audio signals, for instance with regard to audio modification in immersive multimedia. This specification relates, but is not limited to, audio modification during the user consumption phase of a virtual reality or presence captured environment.

BACKGROUND

Virtual reality (VR) is an example of an immersive multimedia which involves displaying a virtual world within a user device, typically a headset worn by the user which has two screens (one for each eye) displaying part of the virtual world dependent on the position and orientation of the user detected using sensors. Headphones are also provided in the headset providing audio, usually spatial audio, thereby adding to the virtual experience. The virtual world may be computer-generated from a real world space captured using a suitable camera and microphone system comprising an array of camera sensors and microphones oriented in respective directions. Nokia's OZO® device is one such capture device, providing both spatial video and audio signals for processing and rendering using suitable VR software on a computer system.

Spatial audio refers to playable audio data that exploits sound localisation. In a real world space there may be multiple audio sources. The location and movement of the sound sources is a parameter of the captured audio. In rendering the audio as spatial audio for playback such parameters are incorporated in the data using processing algorithms so that the listener is provided with an immersive and spatially oriented experience. Nokia's Spatial Audio Capture (SPAC) is an example technology for processing audio captured via a microphone array into spatial audio; that is audio with a spatial percept. The intention is to capture audio so that when it is rendered to a user the user will experience the sound field as if they are present at the location of the capture device.

The consumption phase of VR is when the user is viewing and/or listening to the virtual world content, e.g. when wearing a VR headset.

SUMMARY

According to one aspect, a method comprises: detecting the spatial position of a user in a real world space; providing to the user one or more audio signals representing audio from spatially-distributed audio sources in a virtual space; and responsive to detecting movement of the user's spatial position from within a first zone to within a second zone within the real world space, modifying the audio signals for selected ones of the audio sources based on their spatial position in the virtual space.

The audio sources may be selected based on their spatial position relative to the direction of the user's detected movement.

The audio sources may be selected based on them being substantially in the direction of the user's detected movement.

The audio sources may be selected based on them being within a predefined sector of the virtual space in the direction of the user's detected movement. The predefined sector may be substantially between 70 and 100 degrees.

The second zone may be arranged as a plurality of portions and the audio sources may each be associated with one of said portions, the audio sources being selected based on the second zone portion within which the user moves.

The audio signals may be modified by attenuation. The amount of attenuation may increase with continued movement of the user's spatial motion.

The second zone may be defined by zone data representing a spatial area the boundary of which at least partially surrounds an object in a real world space. The boundary may be a predetermined distance from the object.

A plurality of objects may be present in the real world space and the zone data may represent a restricted area the boundary of which at least partially surrounds the plural objects.

The method may further comprise detecting continued movement of the user's spatial position from within the second zone to within a third zone which is closer to the or each object, and responsive thereto generating an alert signal.

The alert signal may cause a visual alert to be presented through a display. The alert signal may cause an audible alert to be generated. The audible alert may have a higher volume than the signals for the audio sources. The alert signal may be effective to enable a haptic device carried by a user.

No modification of the audio signals may be performed when the user is within the first zone.

Plural audio sources may modified. Plural audio sources may be modified differently. The audio sources may be modified differently based on the distance between the user's spatial position and that of the audio source. The audio sources may be modified differently dependent on type of sound from each audio source. One of the audio sources may be modified at a faster rate than another of the audio sources.

The user movement may be detected based on signals derived from a positioning tag, e.g. a HAIP positioning tag.

Another aspect provides apparatus configured to perform any of the methods above.

According to a second aspect, a computer program comprising instructions that when executed by a computer apparatus control it to perform the method of any preceding definition.

According to a third aspect, a non-transitory computer-readable storage medium is provided having stored thereon computer-readable code, which, when executed by at least one processor, causes the at least one processor to perform a method, comprising: detecting the spatial position of a user in a real world space; providing to the user one or more audio signals representing audio from spatially-distributed audio sources in a virtual space; and responsive to detecting movement of the user's spatial position from within a first zone to within a second zone within the real world space, modifying the audio signals for selected ones of the audio sources based on their spatial position in the virtual space.

According to a sixth aspect, apparatus is provided, the apparatus having at least one processor and at least one memory having computer-readable code stored thereon which when executed controls the at least one processor: to detect the spatial position of a user in a real world space; to provide to the user one or more audio signals representing audio from spatially-distributed audio sources in a virtual space; and responsive to detecting movement of the user's spatial position from within a first zone to within a second zone within the real world space, to modify the audio signals for selected ones of the audio sources based on their spatial position in the virtual space.

According to a seventh aspect, apparatus comprises: means for detecting the spatial position of a user in a real world space; means for providing to the user one or more audio signals representing audio from spatially-distributed audio sources in a virtual space; and means responsive to detecting movement of the user's spatial position from within a first zone to within a second zone within the real world space for modifying the audio signals for selected ones of the audio sources based on their spatial position in the virtual space.

BRIEF DESCRIPTION OF THE DRAWINGS

The invention will now be described, by way of non-limiting example, with reference to the accompanying drawings, in which:

FIG. 15a is a close-up view of the FIG. 13 space, showing how audio sources may be selected for modification;

FIG. 15b is a top plan view of a different real-world space, showing another method of selecting audio sources for modification;

FIG. 16 is a close-up view of the FIG. 13 space, showing how sound from audio sources may be spatially moved responsive to user movement;

FIG. 17 is a top plan view showing how audio sources may be moved responsive to movement of a user in real-world space towards a position having no audio sources;

DETAILED DESCRIPTION OF EMBODIMENTS

Embodiments herein relate to virtual reality (VR) systems, in which a user is provided with a video and audio feed representing a virtual space for immersive output through a headset. It should however be appreciated that the embodiments can be applied to non-video applications whereby only a spatial audio field is captured and provided to a user.

The embodiments are also applicable to Presence-Captured (PC) content.

In overview, embodiments are directed to the consumption phase of VR or PC content (collectively "VR content" for ease of reference) which is the phase where a user wearing a VR headset is viewing and possibly interacting with the VR content. The user will often move whilst consuming VR content, and it is sometimes the case that the real world space will have objects present that are not reflected in the captured and therefore consumed content. For example, the objects may be furniture or walls. This presents a potential hazard in that the user may fall over and injure themselves.

Embodiments herein seek to alleviate this problem by modifying audio signals being played through the VR headset responsive to movement towards one or more such objects. This modifying may be means of attenuating the audio signals representing sounds from one or more audio sources that are (in terms of the spatial audio field being consumed) in the general direction of movement and therefore the direction of the object being approached.

The aim is to direct the user's interest away from the direction of the object in favour of other audio sources, in a way that is less intrusive than, for example, providing a visual warning or similar.

By using attenuation, effectively an auditory black hole may be created in the region of real world objects. This may provide a good indication is of how much freedom of movement is available to the user.

Movement in the real world may or may not be translated to movement in the virtual world or space. In some embodiments, movement in the real world may translate to zero movement, or may translate to rotation or elevation in the virtual world or space.

Figure 1:
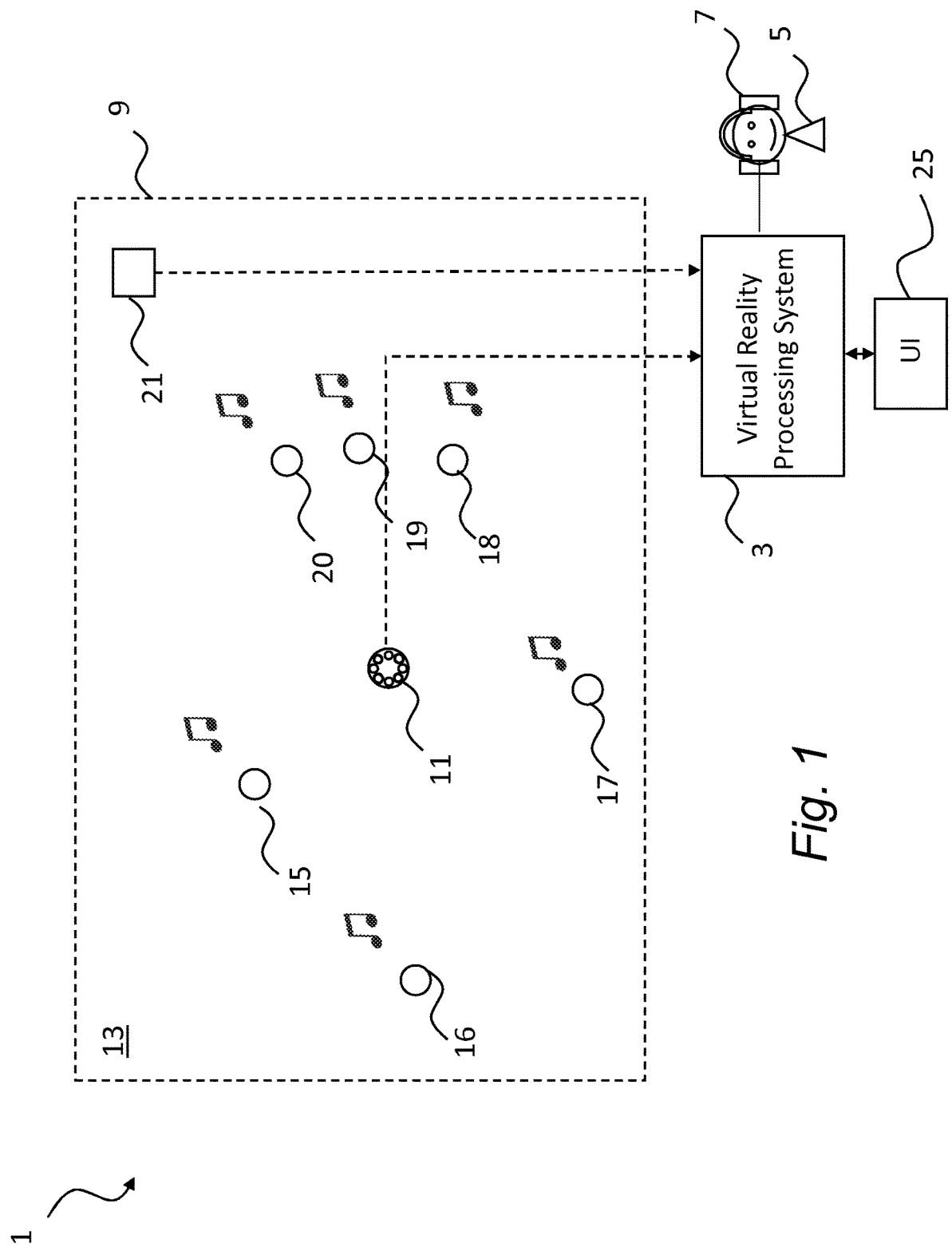
FIG. 1 is a schematic plan view of a distributed audio capture scenario, including related processing and consumption apparatus.

Referring to FIG. 1, an overview of a VR capture scenario 1 is shown together with a first embodiment Virtual Reality Processing System (hereafter "processing system") 3. The processing system 3 is a computer system for capturing and/or rendering spatial video and audio content for delivery to a user 5 wearing a VR headset 7.

FIG. 1 shows in plan-view a capture space 9 which may be for example a concert hall, other music venue, conference hall or indeed any real-world scenario.

A VR capture device 11 for spatial video and audio capture is supported on a floor 13 of the space 9 in relation to multiple audio sources 15-20. The audio sources 15-20 can be any real world source of audio, whether speech, music or other forms of audible noise which may be of interest to a listener. The audio sources 15-20 can be fixed within the space 9 or may be permitted to move. The audio sources 15-20 may each carry a positioning tag (not shown) which may directly or indirectly deliver data indicative of their respective positions to the processing system 3. The positional data may be transmitted wirelessly. The positioning tags may be high accuracy indoor positioning (HAIP) tags which work in association with one or more HAIP locators 21 within the space 9.

The VR capture device 11 may comprise an array of camera and microphone sensors spatially distributed around the body of the device to capture respective video and audio signals for creating spatial video and audio. Nokia's OZO® VR camera is used here as an example of the VR capture device 11, but it will be appreciated that embodiments may employ other capture devices.

In some embodiments, each of the audio sources 15-20 can be object-based sources, one or more of which may have an associated close-up microphone or pick-up which generates an audio signal for the processing system 3. The close-up microphone may be a Lavalier microphone.

The processing system 3 receives the spatial video and audio signals from the capture device 11 and may perform mixing and rendering methods to produce the spatial VR data for playback to the user through the VR headset 7. In some embodiments where the positioning of the audio sources 15-20 is performed, positional data is received by the processing system 3, either directly from the HAIP tags, or from the HAIP locators 21. In some embodiments, direct video recognition techniques may be used to detect audio source position.

A user interface (UI) 25 may be provided in some embodiments to enable user control of certain operations of the processing system 3.

Figure 2:
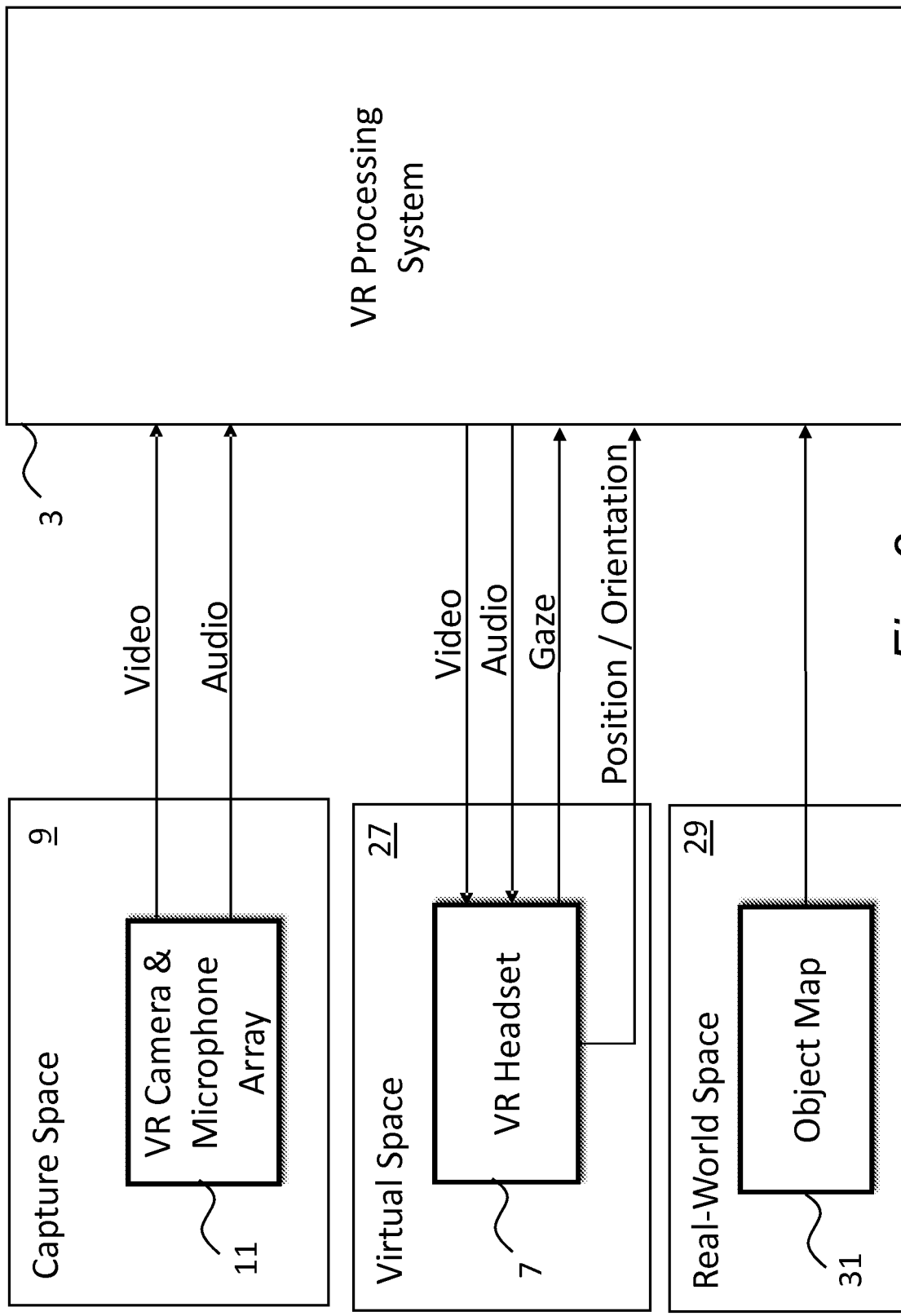
FIG. 2 is a schematic diagram illustrating components of a virtual reality system in relation to capture and playback apparatus.

Referring to FIG. 2, the processing system 3 is shown in relation to the capture device 11 for generating a virtual space 27 displayed in computer-generated form within the headset 7 during VR consumption. The processing system 3 receives from the camera 11 spatial video and audio data and generates the virtual space 27 for display to the VR headset 7. In some embodiments the virtual space 27 may be computer generated, as opposed to being based on a capture space 9.

In use, the processing system 3 receives from the VR headset 7 position and/or orientation data (i.e. motion tracking data) and responsive thereto delivers to the headset video and audio data corresponding to a limited spatial field, or sector, of the virtual space. As the user changes position or head orientation, a different sector is delivered accordingly in real time or near real time.

As will be described below, the processing system 3 may also receive or generate an object map 31 indicating the position of one or more objects in a real-world space 29 in which the content is, or will be, consumed. This indication may be by means of where the objects themselves are located, and/or may be by means of defining permitted and restricted movement zones around objects.

The object map 31 may be received and/or generated prior to VR consumption, or during VR consumption.

In some embodiments, the object map 31 may be generated at the VR processing system 3 based on sensor data received from the real world space 29. This may be performed automatically or manually, e.g. through the UI 25. One or more objects may be present in the real world space 29.

In some embodiments, the sensor data may be positional data indicative of the location of objects within the real-world space 29, such as furniture or walls, and this may be represented in a number of ways.

For example, the sensor data may represent the position of objects, which can be identified by positioning tags, e.g. HAIP tags, placed on objects. HAIP systems use Bluetooth Low Energy (BLE) communication between the tags and the one or more locators. For example, there may be four HAIP locators mounted on, or placed relative to, the camera 11. A respective HAIP locator may be to the front, left, back and right of the camera 11. Each HAIP tag sends BLE signals from which the HAIP locators derive the tag, and therefore, audio source location.

In general, such direction of arrival (DoA) positioning systems are based on (i) a known location and orientation of the or each locator, and (ii) measurement of the DoA angle of the signal from the respective tag towards the locators in the locators' local co-ordinate system. Based on the location and angle information from one or more locators, the position of the tag may be calculated using geometry.

Alternatively, or additionally, the sensor data may represent the object position by visual tracking using a camera, or by radar.

Alternatively, or additionally, the sensor data may represent the locations of tags placed in the real-world space 29 which define one or more zone boundaries close-to, or partially surrounding, one or more objects.

The object map 31 may be used to define so-called safe and restricted zones, the former being an area within the real world space where movement is unrestricted and the latter being an area in which sound modification, e.g. attenuation, is performed.

In some embodiments, multiple restricted zones can be defined, e.g. one adjacent or inside the other, so that a first action is performed when the user enters the outer zone boundary and a second action is performed when the user enters the inner zone boundary, closest to the object.

The second action may be more intrusive than the first action. Where the first action comprises attenuating sound derived from audio sources in the direction of user movement, the second action may comprise issuing a visual, audible and/or haptic alert to the user.

In some embodiments, the object map 31 of the real-world space 29 may be provided in the form of stored media, e.g. downloaded over a network or provided on non-transient memory.

Referring still to FIG. 2, in some embodiments, the system may comprise a first VR processing subsystem for capturing video and/or audio data from the captured space by the camera 11. In some embodiments, the system may comprise a second VR processing subsystem for generating the virtual space 27 displayed in computer-generated form within the VR headset 7. In some embodiments, the system may comprise a third VR processing subsystem for receiving and/or generating the object map 31.

In some embodiments, the subsystems may be separate entities. The first, second and third VR processing subsystems may be connected by a communication network or in general any means for transferring data between the first, second and third VR processing subsystems.

Regarding the VR headset 7, during the consumption phase, the orientation is the direction at which the user is looking at a point in time. This is deduced or estimated using motion tracking sensors in the VR headset 7. A gyroscope is an example of a motion tracking sensor within the VR headset 7 which can detect orientation based on a measured change in direction from a reference position. For example, the orientation of the VR headset 7 may be deduced or estimated in terms of horizontal and/or vertical direction relative to a reference direction, e.g. 10 degrees from a reference direction. External sensors can additionally or alternatively be used to deduce or estimate orientation, e.g. cameras directed at the user.

In some embodiments, data representing the current gaze direction or focus area can be received from the VR headset 7. The gaze direction typically uses one or more cameras provided within the VR headset 7 each of which is directed at the user's eyes and monitors movement in all directions away from a central, reference, position which is usually set or estimated when the user's eyes are looking directly forwards. Again, external sensors can additionally or alternatively be used to deduce or estimate gaze direction.

Figure 3:
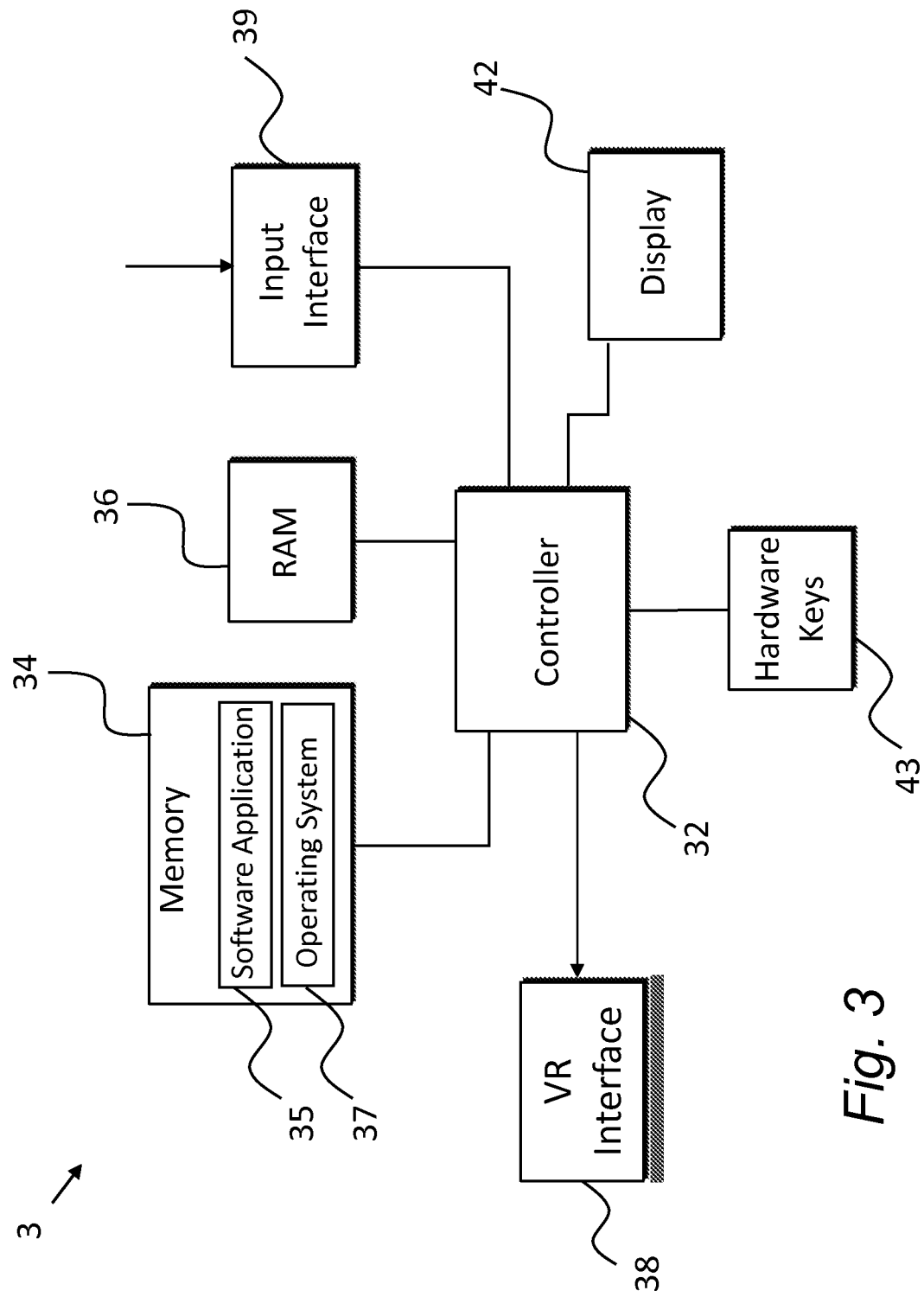
FIG. 3 is a schematic diagram showing components of a the virtual reality system in accordance with embodiments.

For completeness, and referring now to FIG. 3, an example schematic diagram of components of the processing system 3 is shown. The processing system 3 has a controller 32, a memory 34, RAM 36 and a VR interface 38 to the VR headset 7 and/or VR capture device 11, for transmitting and receiving the signals shown in FIG. 2. An input interface 39 may be provided for receiving the object map/sensor data 31 for storing and subsequent processing. A display 42 and hardware keys 43 may be provided for displaying and interacting with the UI 25, which may be needed in situations where some manual control, interaction or video processing is involved. For example, the UI 25 may be used to create the object map 31 based on sensor data from positioning tags indicating the above-mentioned safe and restricted zones in the real world space 29.

The controller 32 is connected to each of the other components in order to control operation thereof.

The memory 34 may be a non-volatile memory such as read only memory (ROM) a hard disk drive (HDD) or a solid state drive (SSD). The memory 34 stores, amongst other things, an operating system 37 and one or more software applications 35. The RAM 36 is used by the controller 32 for the temporary storage of data. The operating system 37 may contain code which, when executed by the controller 32 in conjunction with RAM 36, controls operation of each of the hardware components of the terminal.

The controller 32 may take any suitable form. For instance, it may be a microcontroller, plural microcontrollers, a processor, or plural processors.

The software application 35 is arranged in overview to control output of the VR content to the user 5 through the VR headset 7 which comprises video screens and headphones or similar components. The software application 35 may also control one or more haptic actuators if provided on the VR headset.

The software application 35 is also arranged to modify output of the spatial audio signals dependent on detected movement of the user 5 relative to one or more objects within the real world space 29. This movement is detectable through for example a positioning tag, e.g. a HAIP tag, provided on the VR headset 7 or other means, such as by visual analysis using one or more cameras.

Using the object map 31, the software application 35 may determine if and when a user moves from a safe zone to a restricted zone within predetermined range of the object, and, if so, modifies the audio signals from selected audio source(s) in the general movement direction in order to direct the user's interest towards another direction to avoid collision. One or more audio sources may be modified, depending on their relative location to the zone boundary or boundaries and therefore to the object in real world space. The selected audio source(s) may include a plurality of audio sources which are, for example, within a predetermined angular sector extending from the user's position in the movement direction.

The sector may represent a field-of-interest, which is the extent of the virtual world that is seen or otherwise presented by the VR headset 20 at any given moment. Thus, a sector may refer to any sub-portion of the available spatial field, in this case less than 360 degrees and more likely to be in the order of 70-100 degrees. As the user changes direction, a different sector of the available spatial field is delivered in real time or near real time. The different sector may overlap with a previous sector.

In examples herein, audio signal modification is by means of attenuation of the selected audio source signals. The amount and rate of attenuation may be dependent on the distance of the source(s) to the zone boundary or boundaries.

Figure 4:
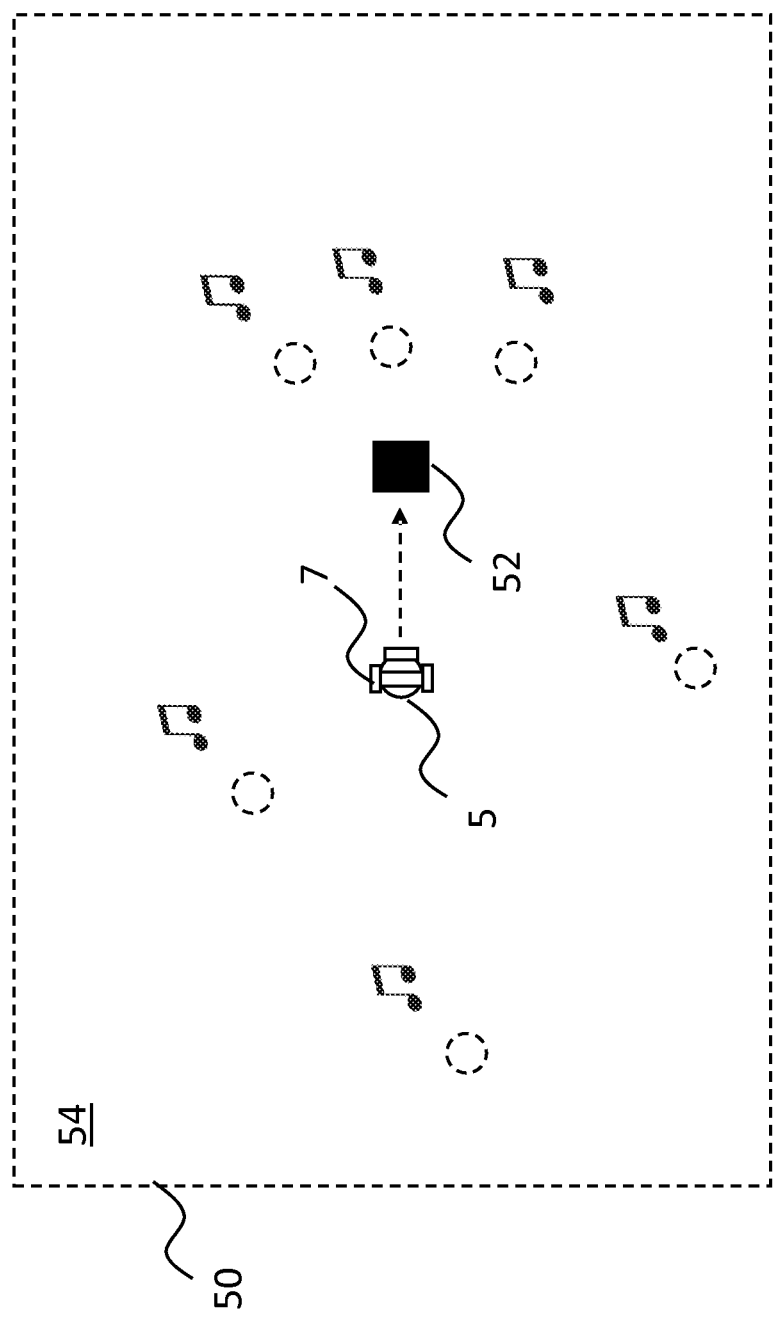
FIG. 4 is a top plan view of a real-world space in which a user consumes VR content captured from the FIG. 1 scenario.

In a first example, FIG. 4 shows a real-world space 50 in which the user 5 with VR headset 7 consumes the VR content captured from the FIG. 1 scenario. For ease of explanation, overlaid in the real-world space 50 are the spatial audio sources 15-20, shown in FIG. 1, to indicate where the user perceives their respective sounds to be coming from. A single object 52 is shown on the floor 54 of the real-world space 50. During consumption of the VR content, the user 5 may move in any direction, including towards the object 52 as shown. In some situations, the user 5 may be facing in the opposite direction and may move backwards towards the object 52.

Figure 5:
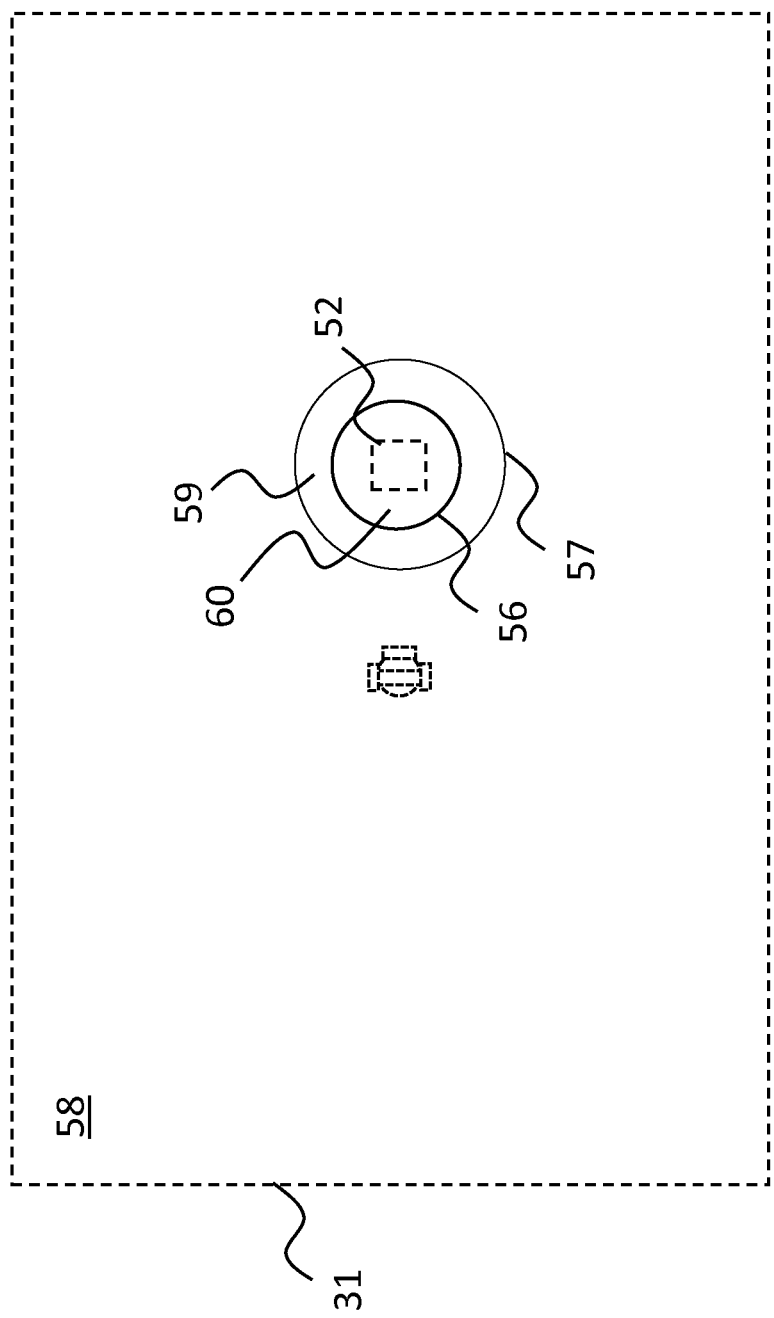
FIG. 5 is a schematic view of an object map relating to the FIG. 4 space, showing safe and restricted zones in accordance with embodiments.

The object map 31 may represent the position of this object 52. FIG. 5 shows an example object map 31 in visual representation, with one or more zone boundaries 56, 57 which define a safe zone 58 and two restricted zones 59, 60. The boundaries 56, 57 and zones 58-60 may be generated manually or automatically. In some embodiments, one restricted zone may be defined, or a greater number of restricted zones may be defined. The user 5 and object 52 are shown in phantom lines to show their relative positions on the object map 31.

The zone boundaries 56, 57 may have any shape and/or may be partial, i.e. a line, a curve or a complex shape. The distance between different parts of a boundary 56, 57 and the object 52 may vary. Here, two restricted zones 59, 60 are defined as concentric circles.

As mentioned above, the restricted zones 59, 60 may be defined using a number of methods, including, but not limited to, using HAIP positioning tags to mark boundaries, and/or using the UI 25 to manually draw a boundary line around the object 52, or to connect discrete positioning tag positions.

Figure 6:
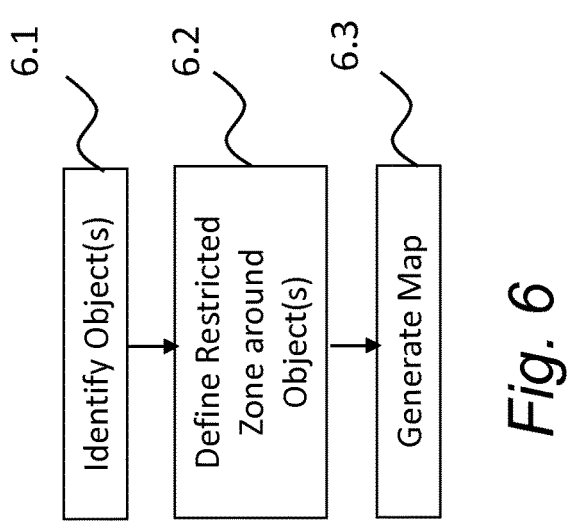
FIG. 6 is a flow diagram showing processing steps in a method of defining restricted zones in accordance with embodiments.

FIG. 6 is a flow chart for showing a generalised method of creating the object map 31. In a first step 6.1 one or more objects 52 are identified. In a second step 6.2, a restricted zone is defined around the object 52, at least partially. In a third step 6.3, the map 31 is generated or updated and saved.

Figure 7:
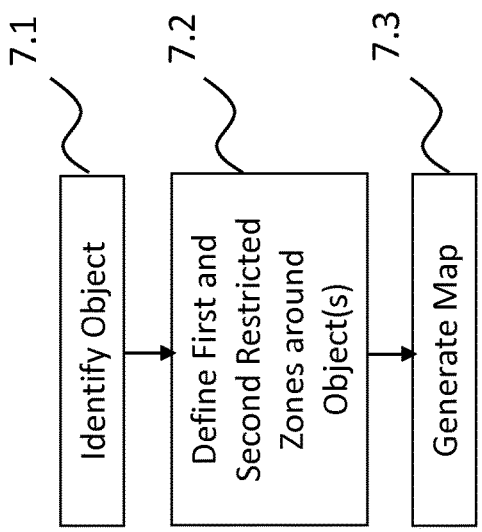
FIG. 7 is a flow diagram showing processing steps in a method of defining multiple restricted zones in accordance with embodiments.

FIG. 7 is a flow chart for showing a generalised method for creating the object map 31 shown in FIG. 5. In a first step 7.1 one or more objects 52 are identified. In a second step 7.2, first and second restricted zones 59, 60 are defined. In a third step 7.3, the map 31 is generated or updated and saved.

In operation, the software application 35 may use the object map 31 automatically to modify spatial audio signals when the user 5 moves from the allowable zone 58 to the first restricted zone 59. This will be explained in further detail below.

Figure 8:
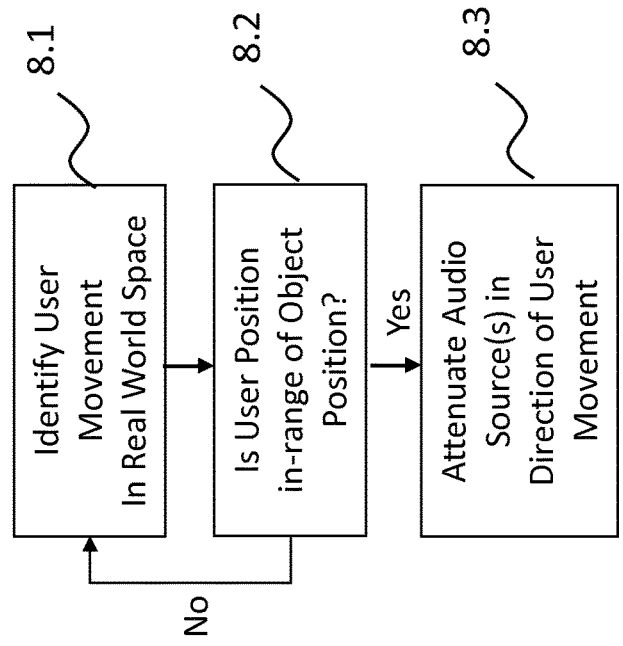
FIG. 8 is a flow diagram showing processing steps in a method of modifying sound from one or more audio sources responsive to user movement in accordance with embodiments.

FIG. 8 is a flow chart for showing a generalised method of operation of the software application 35. In a first step 8.1, spatial movement of the user in real world space 50 is identified or tracked. In step 8.2, it is determined whether the spatial position is in-range of the object 52, in other words whether it is within a restricted zone. If not, then the process repeats from the first step 8.1. If it is in-range, then in step 8.3, the audio signals from one or more selected audio sources are modified, e.g. attenuated. The selected audio sources are those in the general direction of user movement or within a sector representing a current area-of-interest in said general direction.

Figure 9:
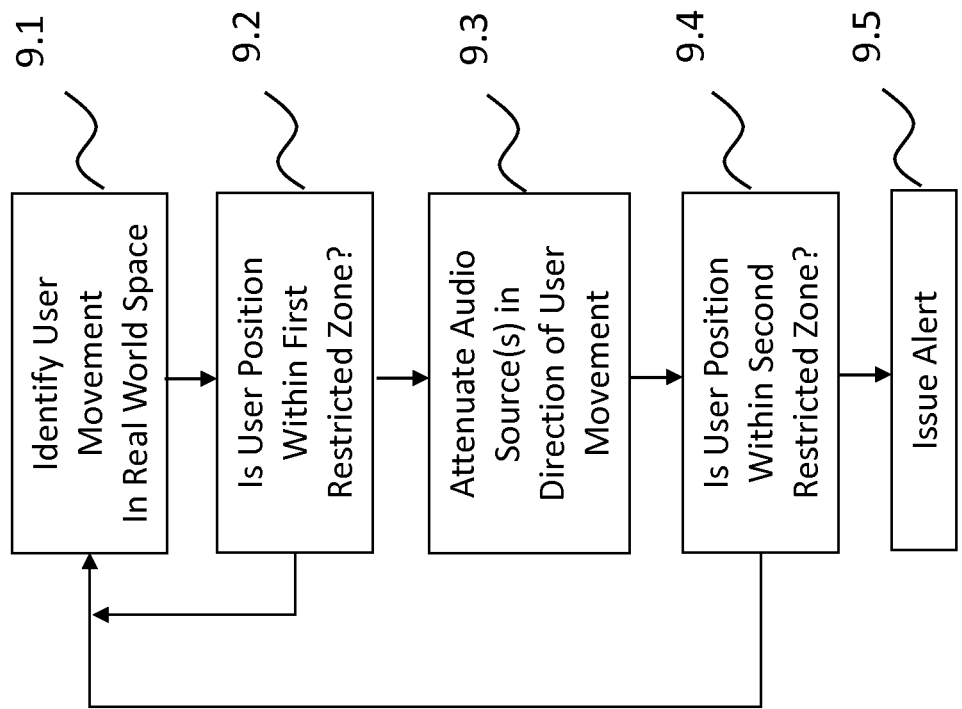
FIG. 9 a flow diagram showing processing steps in a further method of modifying sound from one or more audio sources in accordance with embodiments.

FIG. 9 is a flow chart for showing a generalised method of operation of the software application 35 using the FIG. 5 object map 31. In a first step 9.1, the spatial movement of the user in real world space 50 is identified or tracked. In step 9.2, it is determined whether the spatial position is within the first restricted zone 59. If not, then the process repeats from the first step 9.1. If it is, then in step 9.3 the audio signals from one or more selected audio sources are modified, e.g. attenuated. In step 9.4, it is determined whether the spatial position is within the second restricted zone 60. If not, then the process repeats from the first step 9.1. If it is, then in step 9.5 an alert signal is issued to the user 5 through the headset 7.

Figure 10:
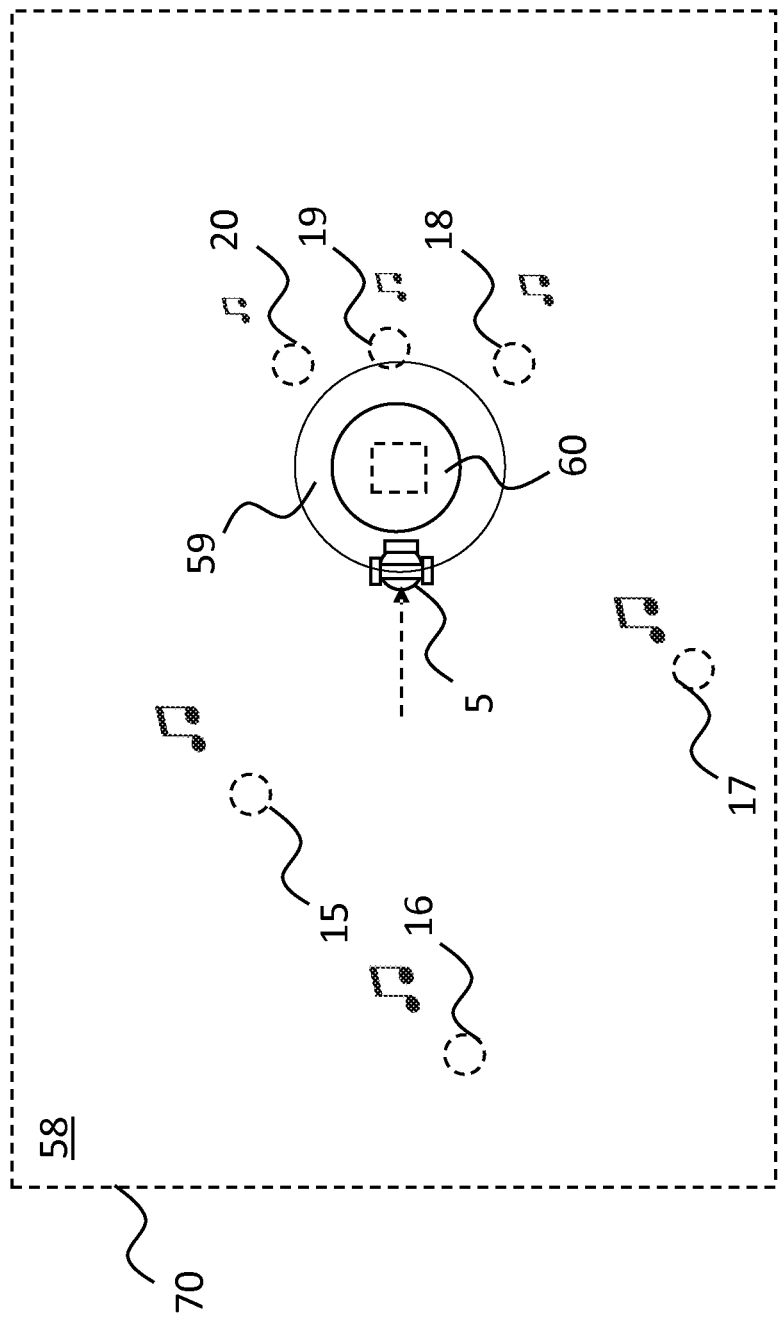
FIG. 10 is a top plan view showing movement of a user in real-world space in relation to the FIG. 5 restricted zones in accordance with embodiments.

Referring to FIG. 10, a visual representation 70 of the FIG. 9 method is shown. In this situation, the user 5 has moved from the safe zone 58 into the first restricted zone 59. Responsive to this, the audio signals representing sound from the audio sources 18, 19 and 20 in the direction of movement is attenuated. The sound from the other audio sources 15, 16, 17 remains unchanged. The resulting change in sound aims to direct the user away from the object in a non-intrusive manner.

In some embodiments, further movement of the user 5 within the first restricted zone 59 (in generally the same direction) may cause a variation in the attenuation. In some embodiments, attenuation increases as the user 5 moves further in the first restricted zone 59 towards the object 52. In some embodiments, attenuation increases as the user 5 moves further from the first restricted zone 59 into the second restricted zone 60.

In some embodiments, attenuation increases until the sound from the selected audio sources 18, 19, 20 are muted.

In some embodiments, the rate of attenuation is different for different ones of the selected audio sources 18, 19, 20 which may for example be dependent on their respective positions in relation to the user 5 or to the object position. For example, greater attenuation or a greater rate of attenuation may be applied to those sound sources 18, 19, 20 which are closer, and/or the attenuation may come in sooner than for more distant sound sources.

Movement of the user 5 into the second restricted zone 60 may effect issue of an alert signal, which may involve one or more of providing an audible warning, a visual warning and/or haptic feedback to the VR headset 7. For example, the audible warning may be a spoken message such as "Object" or an alarm sound. For example, the visual warning may be a presented symbol or change in colour in the VR video. A haptic actuator may be provided on the VR headset 7 for vibrating in response to a haptic alert signal. Any or all of these alert methods may be applied to avoid collision should the user 5 not have responded to the prior attenuation signalling.

A further example will now be explained with reference to FIGS. 11-17.

Figure 11:
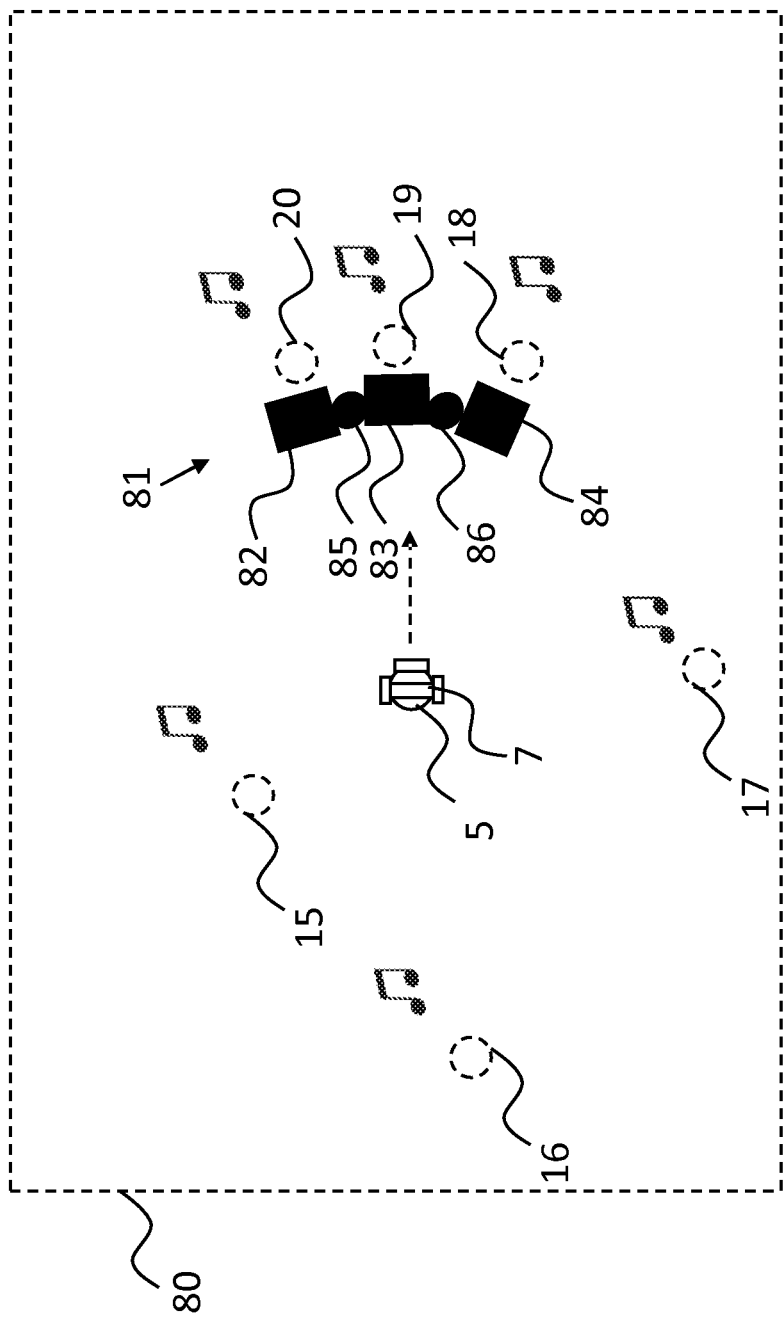
FIG. 11 is a top plan view of a further real-world space in which a user consumes VR content captured from the FIG. 1 scenario.

FIG. 11 shows a real-world space 80 in which the user 5 with VR headset 7 consumes the VR content captured from the FIG. 1 scenario. Similar to FIG. 4, overlaid in the real-world space 80 are the spatial audio sources 15-20 to indicate where the user 5 perceives their respective sounds to be coming from. Plural objects, collectively indicated 81, are present on the floor of the space 80, being an arrangement of furniture comprising for example three chairs 82, 83, 84 and two tables 85, 86. During consumption of the VR content, the user 5 may move in any direction, including towards the objects 81 as shown. In some situations, the user 5 may face in the opposite direction and move backwards towards the objects 81.

Figure 12:
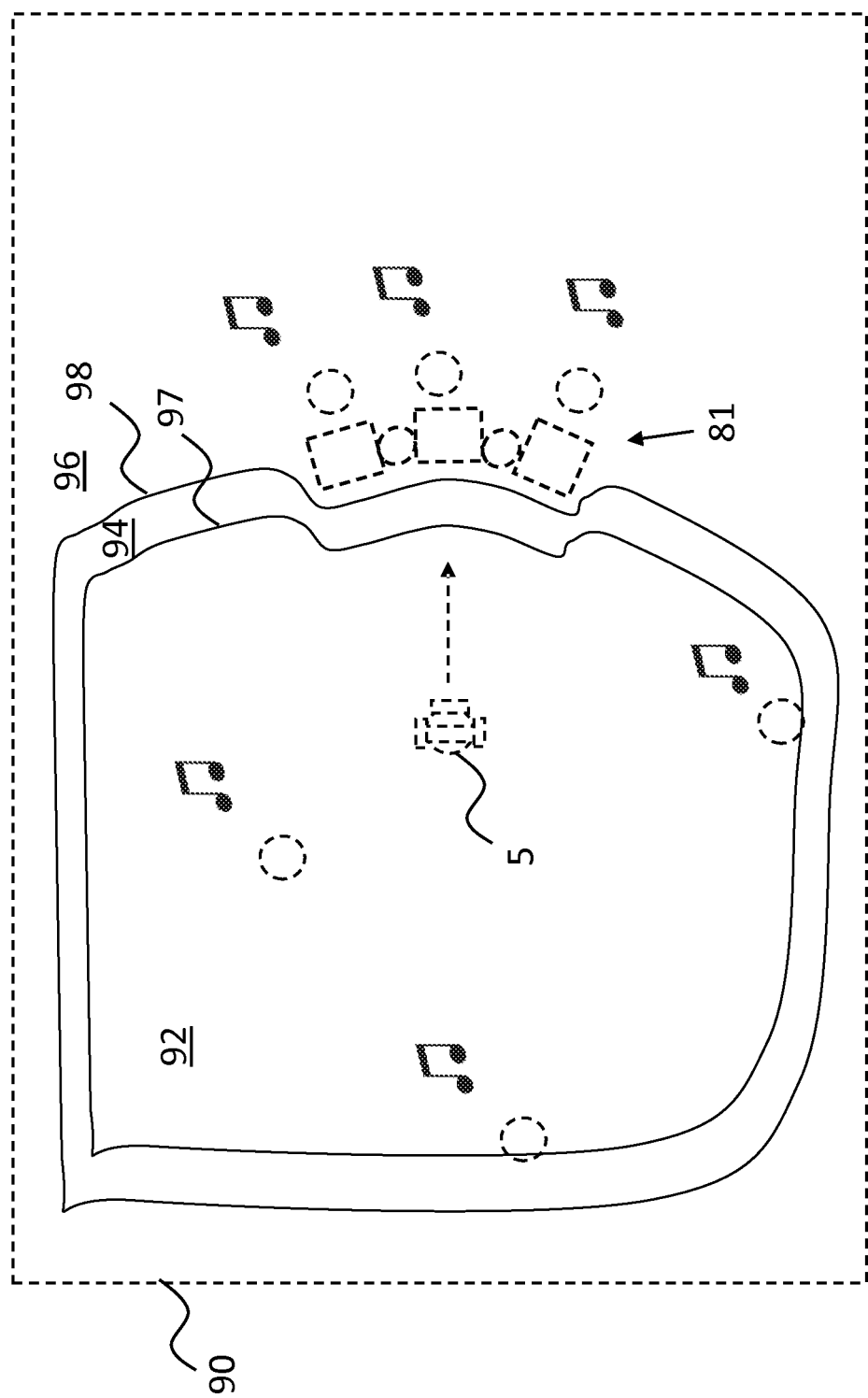
FIG. 12 is a schematic view of an object map relating to the FIG. 11 space, showing safe and restricted zones in accordance with embodiments.

FIG. 12 shows an example of an object map 90 generated for the real world space 80 in visual representation. The object map 31 may comprise a safe zone 92, a first restricted zone 94 and a second restricted zone 96, divided by first and second boundary lines 97, 98 respectively. The boundary lines 97, 98 may be generated manually or automatically. In some embodiments, one restricted zone may be defined, or a greater number of restricted zones. The user 5 and objects 81 are shown in phantom lines to show their relative positions on the object map 90.

The zone boundaries 97, 98 may have any shape and/or may be partial, i.e. a line, a curve or a complex shape. Here, the generated boundaries are complex. The distance between different parts of the boundaries 97, 98 and the objects 81 may vary.

As mentioned above, the restricted zones 97, 98 may be defined using a number of methods, including, but not limited to, using HAIP positioning tags to mark boundaries, and/or using the UI 25 to manually draw a boundary line around the objects 81, or to connect discrete positioning tag positions.

Figure 13:
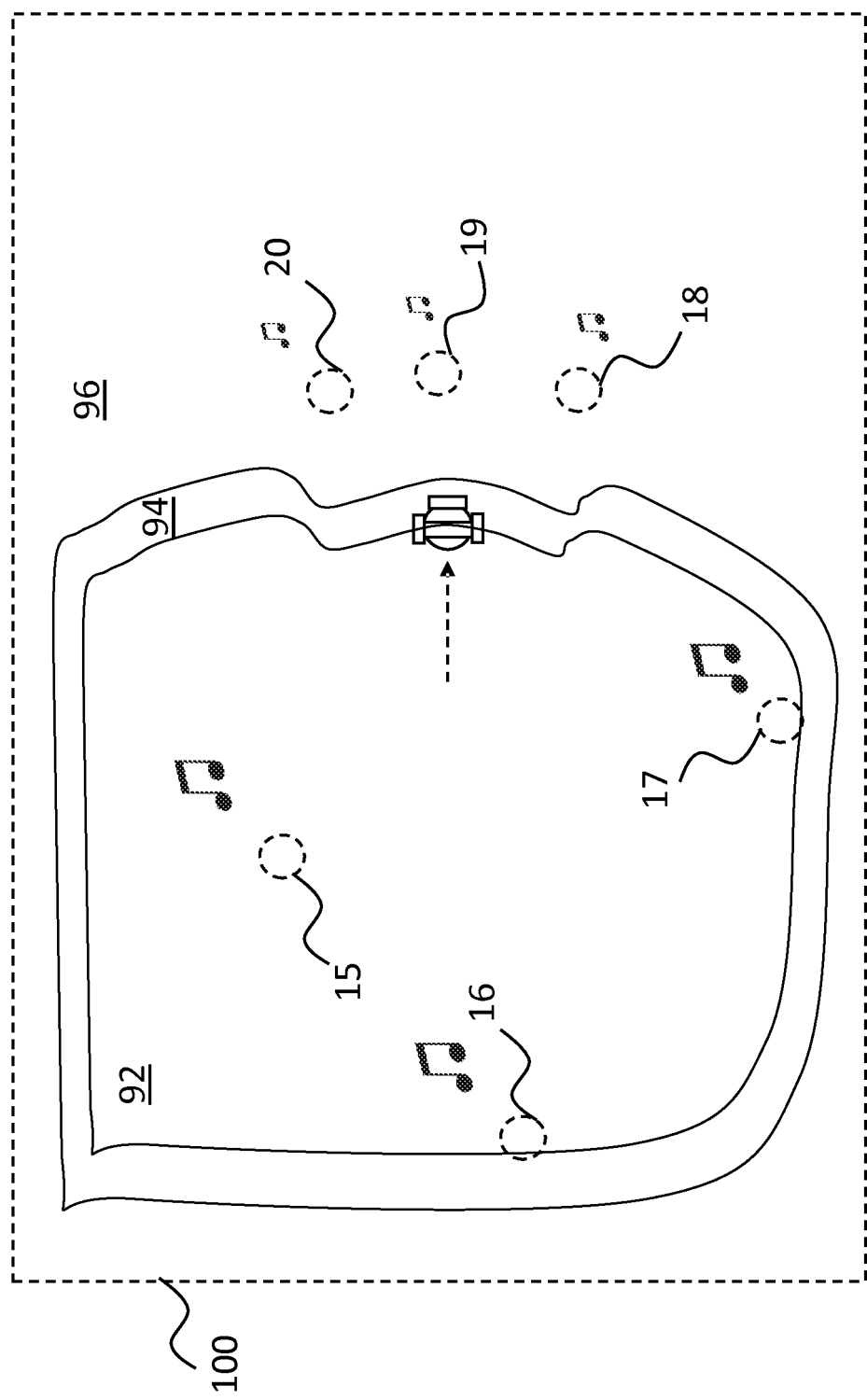
FIG. 13 is a top plan view showing movement of a user in real-world space in relation to the FIG. 12 restricted zones in accordance with embodiments.

Referring to FIG. 13 a visual representation 100 of the FIG. 9 method is shown for the FIG. 12 object map 90. In this situation, the user 5 has moved from within the safe zone 92 into the first restricted zone 94. Responsive to this, the audio signals representing sound from the audio sources 18, 19 and 20 in the direction of movement are attenuated. The sound from the other audio sources 15, 16, 17 remains unchanged. The resulting change in sound aims to direct the user away from the object 81 in a non-intrusive manner.

Further movement of the user 5 within the first restricted zone 94 (in generally the same direction) may cause variation in the attenuation. In some embodiments, attenuation increases as the user 5 moves further into the first restricted zone 94. In some embodiments, attenuation increases until the sounds from the selected audio sources 18, 19, 20 are muted, effectively creating an auditory 'black hole'. In some embodiments, the rate of attenuation is different for different ones of the selected audio sources 18, 19, 20 which may for example be dependent on their respective positions in relation to the user 5 or the objects 81. For example, greater attenuation or a greater rate of attenuation may be applied to those sound sources 18, 19, 20 which are closer, and/or the attenuation may come in sooner than for more distant sound sources.

Figure 14:
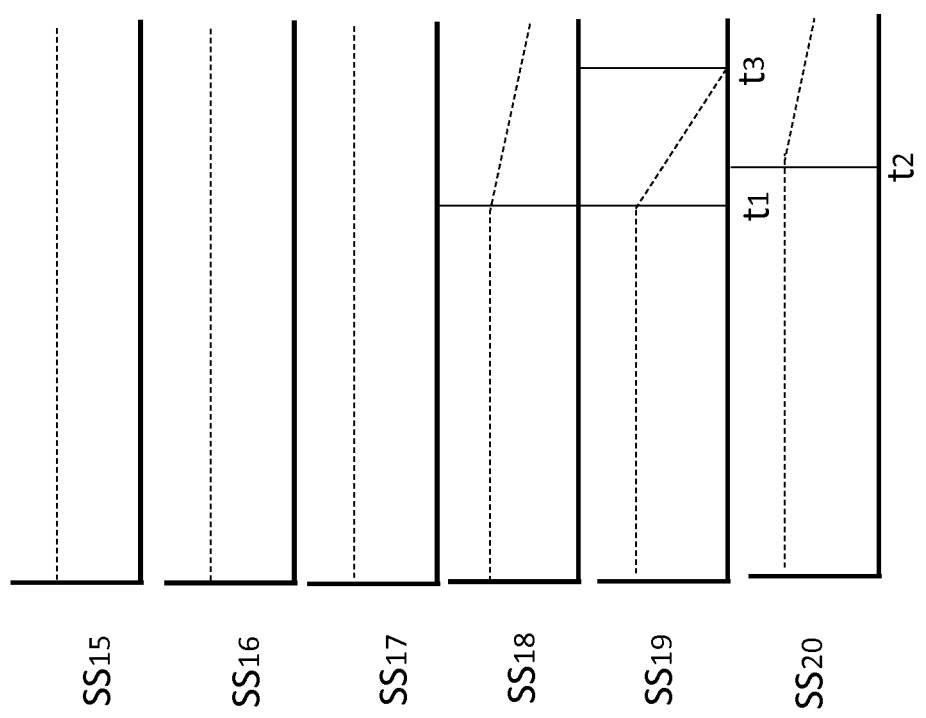
FIG. 14 shows graphs for each of a number of audio sources in the FIG. 11 space, indicative of attenuation relative to user movement in the FIG. 13 example.

FIG. 14 shows for each of the sounds played from sound sources 15-20 the change in attenuation for the sound sources as the user 5 moves towards the objects 81 and into the first restricted zone 94. It will be seen that sound from the sound sources 15, 16, 20 not in the direction of movement remains constant. At a time t1, attenuation of sound from the sound sources 18, 19 (which the user is closer to)

is triggered, which in this case occurs before attenuation of sound source 20 at time t2, which is slightly further away. The rate of attenuation of the closest sound source 19 is faster than that of the other sound sources 18, 20 and is muted at time t3.

Attenuation profiles may be created and stored for each of the sound sources 15-20 defining how attenuation is to be performed.

Movement of the user 5 into the second restricted zone 96 may effect issue of the above-mentioned alert signal, which may involve one or more of providing an audible warning, a visual warning and/or haptic feedback to the VR headset 7. In FIG. 14 this occurs at time t3.

Selection of which sounds to attenuate may use different methods. The selection may involve attenuating sounds from sound sources 18, 19, 20 in the general direction of user movement, as indicated in examples above.

In some embodiments, this may comprise determining a sector 110 as indicated in FIG. 15a which can cause selection of one or more audio sources 18, 19, 20 covered within the said sector. The sector 110 may typically be between 70 and 100 degrees.

In some embodiments, this may comprise associating audio sources with particular portions of the first restricted zone. For example, with reference to FIG. 15b, safe and first restricted zones 111, 112 may be defined and the latter may be divided into two or more spatial portions, here indicated between the dotted diagonal lines. The portions may be of any shape and size, and one or more may be different from the others. Each sound source may be assigned or associated with a particular portion of the first restricted zone 112 and may be modified responsive to the user moving into the associated portion. In the shown example, first and second audio sources 115, 116 are associated with a first portion 113 of the first restricted zone 112. Responsive to the user moving from the safe zone 111 into the portion 113 of the first restricted zone 112, the first and second audio sources 115, 116 are attenuated and the other audio sources not modified.

In some embodiments, other sound source modifications may be applied in addition or alternatively to attenuation.

With reference to FIG. 16, for example, the software application 35 may modify the spatial location of one or more sounds when rendered in the virtual world to reflect the real world hazard. In the shown example, the rendered sound from one or more of the sound sources 18, 19, 20 may move towards the object location, as indicated by the arrow 114.

With reference to FIG. 17, for example, in the situation where the user 5 is moving towards part of the space where there is no sound, indicated by the arrow 116, the overall ambience or background noise or music etc. may be rendered so that it is perceived as coming from all directions.

In some embodiments, sound from selected ones of the sound sources 15-20, for example those closest to the general direction of movement, may be spatially moved to cover the 'auditory black hole' towards where the user 5 is heading. The selected sound source may be the closest sound source or a predetermined number of closest sound sources, e.g. two. The selected sound sources may be selected using a predetermined rule, e.g. only sound sources within a 180 degree field-of-view can be used.

Movement of sound from the sources 16, 17 in this case move as shown by the arrows 118, 120, and the sound is attenuated as before when the user 5 reaches the first restricted area.

In some embodiments, an audio warning may start to develop in place of the above-mentioned auditory black hole. Whilst it may be more intrusive overall, this implementation has the advantage that the overall audio volume is kept constant. In other embodiments, the overall audio volume can be kept constant by increasing the volume of sounds from the other, non-selected, audio sources. So, in the case of the FIG. 13 example, sound from sound sources 15, 16, 17 may be increased relative to the attenuation of sound from sources 18, 19, 20 to keep the overall volume constant.

As mentioned above, there are various methods by which the safe and restricted areas of the object map can be defined.

In one method, visual tracking and/or radar may be used. Such methods are relatively useful if automatic and reliable.

In other methods, the use of radio frequency (RF) positioning tags is employed, such as HAIP tags used in Nokia's Spatial Audio Capture (SPAC) technology. This has the advantage that the same HAIP tags can be used subsequent to the mapping stage for enhanced content capture and consumption.

Figure 18:
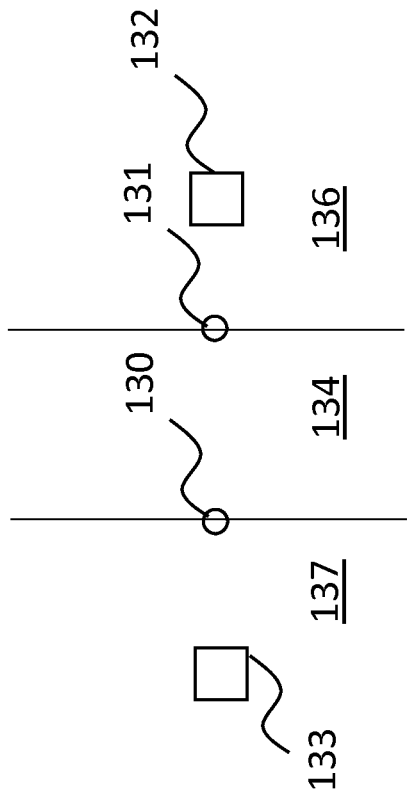
FIG. 18 is a schematic view of positioning tags placed relative to objects for defining safe and restricted zones in accordance with embodiments.

In one method of mapping setup, the zones may be defined simply by placing HAIP tags at safe locations between which the safe area is automatically or manually defined. Referring to FIG. 18, first and second HAIP tags 130, 131 are shown placed between first and second objects 132, 133. The object map can be generated automatically by receiving the respective positions of the HAIP tags 130, 131 and defining the region 134 in-between as a safe zone and the other regions 136 and 137 as restricted zones.

Figure 19:
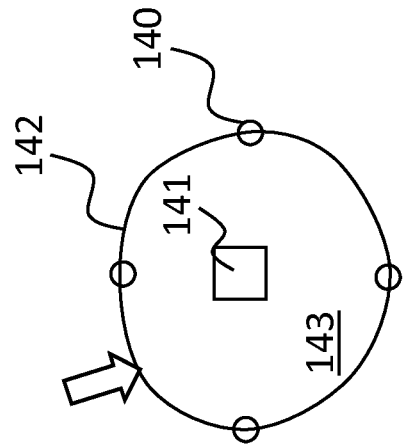
FIG. 19 is a schematic view of positioning tags placed relative to an object for defining through a user interface safe and restricted zones in accordance with embodiments.

For example, the UI 15 may be used to visualize the location of the HAIP tags based on detected position. A user may then manually draw line(s) connecting the tag locations. Referring to FIG. 19, a plurality of HAIP tags 140 are placed around an object 141. When the respective positions are shown on the UI 15, a line 142 may be drawn by the user which connects these tags 140 and the inside space 143 designated the restricted space. This can be performed automatically also.

Additionally, or alternatively, the HAIP tags may be placed in a predetermined order to automatically define the shape of the zones, or at least the safe zone. Additionally or alternatively, the application 35 may automatically define the smallest area enclosed by a plurality of HAIP tags as the safe area. A different set of HAIP tags may then be used to define the first restricted areas and so on.

The position of the user 5 may be determined in the real world space by means of a HAIP tag or this can be built-in to the headset 7.

In some embodiments, placing the HAIP tags may be detected and followed by visual analysis using a video camera. Thus, the area defined by the HAIP tags is matched to any obstacles observed by the camera.

In some embodiments, only the edge or boundary of the second, or nearest restricted zone may be specified by the user. The first restricted zone may then be automatically determined. This may take into account, for example, the size of the space, previous user movement patterns, and the type of content if known. In some embodiments, the area may be adaptive. For example, as objects are removed, the application 35 may increase the size of the safe zone. Alternatively, the size may shrink if an object is added. Alternatively, the shape and size of the safe zone may be modified by moving the HAIP tags. The user may receive a notification if the safe zone shape and/or size has been changed. The notification may be audible, visible, or haptic feedback or any combination of those. The notification may indicate the direction where the safe zone shape and/or size has been changed.

In some embodiments, instead of capturing the spatial audio through the camera device 3, each of the sound sources may carry a close-up microphone, e.g. a Lavalier microphone, or electronic pick-up, which provides an audio signal for the particular sound source, the spatial position of which is known through use of the HAIP tags or other positioning apparatus.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
   detecting, with an apparatus, a spatial position of a user in a real world space;
   providing, with the apparatus, to the user one or more audio signals representing audio from spatially-distributed audio sources in a virtual space; and
   responsive to detecting movement of the user's spatial position in a first direction from a first position in a first zone to a second position in a second zone within the real world space, modifying, with the apparatus, the one or more audio signals for selected ones of the audio sources based on their respective spatial positions in the virtual space, wherein the selected ones of the audio sources are selected based on their respective spatial positions being substantially within a sector of the virtual space extending from the second position in the first direction,
   wherein the first zone comprises a safe zone and the second zone comprises a restricted zone,
   wherein the second zone is defined based, at least partially, on zone data representing a spatial area, wherein a boundary of the spatial area at least partially surrounds an object in the real world space, wherein a location of the object in the real world space corresponds to a location within the second zone.

2. The method of claim 1, wherein the one or more audio signals are modified with at least one of:
   attenuation, or
   modification of a respective spatial position associated with the one or more audio signals.

3. The method of claim 2, wherein an amount of the attenuation increases with continued spatial movement of the user.

4. The method of claim 1, wherein a plurality of the audio sources are modified.

5. The method of claim 4, wherein the plurality of audio sources are modified differently based on a respective distance between the user's spatial position and that of respective ones of the plurality of audio source.

6. An apparatus comprising
   at least one processor and at least one non-transitory memory having computer-readable code stored thereon the at least one memory and the computer-readable code configured to, with the at least one processor, cause the apparatus, at least:
   to detect a spatial position of a user in a real world space;
   to provide to the user one or more audio signals representing audio from spatially-distributed audio sources in a virtual space; and
   responsive to detecting movement of the user's spatial position in a first direction from a first position in a first zone to a second position in a second zone within the real world space, to modify the one or more audio signals for selected ones of the audio sources based on their respective spatial positions in the virtual space, wherein the selected ones of the audio sources are selected based on their respective spatial positions being substantially within a sector of the virtual space extending from the second position in the first direction, wherein the first zone comprises a safe zone and the second zone comprises a restricted zone,
   wherein the second zone is defined based, at least partially, on zone data representing a spatial area, wherein a boundary of the spatial area at least partially surrounds an object in the real world space, wherein a location of the object in the real world space corresponds to a location within the second zone.

7. The apparatus of claim 6, configured to modify the one or more audio signals with at least one of:
   attenuation, or
   modification of a respective spatial position associated with the one or more audio signals.

8. The apparatus of claim 7, configured to increase an amount of the attenuation with continued spatial movement of the user.

9. The apparatus of claim 6, configured to modify a plurality of the audio sources.

10. The apparatus of claim 9, configured to modify the plurality of audio sources differently based on a respective distance between the user's spatial position and that of respective ones of the plurality of audio source.

11. A non-transitory computer-readable storage medium having stored thereon computer-readable code, which, when executed with at least one processor, cause the apparatus to perform:
    detecting a spatial position of a user in a real world space;
    providing to the user one or more audio signals representing audio from spatially-distributed audio sources in a virtual space; and
    responsive to detecting movement of the user's spatial position in a first direction from a first position in a first zone to a second position in a second zone within the real world space, modifying the one or more audio signals for selected ones of the audio sources based on their respective spatial positions in the virtual space, wherein the selected ones of the audio sources are selected based on their spatial position being substantially within a sector of the virtual space extending from the second position in the first direction,
    wherein the first zone comprises a safe zone and the second zone comprises a restricted zone,
    wherein the second zone is defined based, at least partially, on zone data representing a spatial area, wherein a boundary of the spatial area at least partially surrounds an object in the real world space, wherein a location of the object in the real world space corresponds to a location within the second zone.

12. The non-transitory computer-readable storage medium of claim 11, wherein the computer-readable code, when executed with the at least one processor, causes the apparatus to modify the one or more audio signals with at least one of:

attenuation, or modification of a respective spatial position associated with the one or more audio signals.

13. The non-transitory computer-readable storage medium of claim 12, wherein the computer-readable code, when executed with the at least one processor, causes the apparatus to increase an amount of the attenuation with continued spatial movement of the user.

14. The non-transitory computer-readable storage medium of claim 11, wherein the computer-readable code, when executed with the at least one processor, causes the apparatus to modify a plurality of the audio sources.

15. The non-transitory computer-readable storage medium of claim 14, wherein the computer-readable code, when executed with the at least one processor, causes the apparatus to modify the plurality of audio sources differently based on a respective distance between the user's spatial position and that of respective ones of the plurality of audio source.

16. The method of claim 1, further comprising:

detecting continued movement of the user's spatial position from within the second zone to within a third zone, wherein the third zone is closer to the object in the real world space than the second zone, wherein the third zone at least partially surrounds the object in the real world space; and generating an alert signal based on the detecting of the continued movement.

17. The method of claim 16, wherein the alert signal causes generation of one or more of:

a visual alert, an audible alert, or a haptic alert.

18. The method of claim 1, wherein the modifying of the one or more audio signals is based, at least partially, on a distance between the selected ones of the audio sources and the boundary of the spatial area of the second zone.

19. The method of claim 1, wherein the first zone surrounds the second zone.

20. The method of claim 1, wherein the selected ones of the audio sources are selected based on their spatial position being substantially within the second zone.

* * * * *